(12) United States Patent
Walters

(10) Patent No.: US 12,483,856 B1
(45) Date of Patent: Nov. 25, 2025

(54) FRAMEWORK FOR REVERSE GEOCODING FOR REAL USER MONITORING

(71) Applicant: Cisco Technology, Inc., San Jose, CA (US)

(72) Inventor: Joshua Walters, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 645 days.

(21) Appl. No.: 17/722,134

(22) Filed: Apr. 15, 2022

(51) Int. Cl.
*H04W 4/02* (2018.01)
*H04W 4/021* (2018.01)
*H04W 4/029* (2018.01)
*H04W 4/24* (2018.01)

(52) U.S. Cl.
CPC ........... *H04W 4/022* (2013.01); *H04W 4/029* (2018.02); *H04W 4/24* (2013.01)

(58) Field of Classification Search
CPC ........ H04W 4/022; H04W 4/029; H04W 4/24
See application file for complete search history.

(56) References Cited

U.S. PATENT DOCUMENTS

| | | | |
|---|---|---|---|
| 6,473,692 B2 * | 10/2002 | Hancock | H04L 67/51 701/409 |
| 7,937,344 B2 | 5/2011 | Baum et al. | |
| 8,112,425 B2 | 2/2012 | Baum et al. | |
| 8,548,735 B2 * | 10/2013 | Forstall | H04M 1/72403 701/428 |
| 8,751,529 B2 | 6/2014 | Zhang et al. | |
| 8,788,525 B2 | 7/2014 | Neels et al. | |
| 8,799,799 B1 * | 8/2014 | Cervelli | G06F 3/04842 707/723 |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2019/0098106 A1 | 3/2019 | Mungel et al. | |

OTHER PUBLICATIONS

Address geocoding. Wikipedia. The Way Back Machine. Mar. 19, 2022. https://web.archive.org/web/20220412185833/https://en.wikipedia.org/wiki/Mercator_projection (Year: 2022).*

(Continued)

*Primary Examiner* — Nader Bolourchi
(74) *Attorney, Agent, or Firm* — Kilpatrick Townsend & Stockton LLP

(57) ABSTRACT

Described herein is a framework for identifying one or more points-of-interest that are geographically proximal to a geographical location of the mobile device. Geographical location information of a mobile device is transformed from a first format to a second format by performing a Mercator projection of the geographical location information in the first format. Using a point-of-interest search memory structure, one or more points-of-interest are identified that are geographically proximal to a geographical location of the mobile device, wherein the point-of-interest search memory structure includes location information for a plurality of points-of-interest. Information indicative of the one or more points-of-interest are transmitted to an analytical server to enable the analytical server to perform analysis related to the mobile device.

14 Claims, 7 Drawing Sheets

(56) References Cited

OTHER PUBLICATIONS

Mercator projection. Wikipedia. The Way Back Machine. Apr. 12, 2022. https://web.archive.org/web/20220319222410/https://en.wikipedia.org/wiki/Address_geocoding (Year: 2022).*
Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

FRAMEWORK FOR REVERSE GEOCODING FOR REAL USER MONITORING

FIELD

The present disclosure relates generally to a framework for identifying one or more points-of-interest that are geographically proximal to a geographical location of the mobile device.

BACKGROUND

Computer systems may run applications or services that are provided via a server or a cloud-computing environment. The applications or services may be developed and deployed as a single unit or as multiple units, such as a collection of micro-services. With the rise of cloud native applications, e.g., Software as a Service (SaaS) applications, which include microservices, there has been a shift in the manner in which software is deployed, as well as in the manner in which the software is monitored and observed.

Diligent application performance monitoring (APM) is required on the part of developers of microservices-based applications to ensure that their software delivers a steady baseline performance. APM typically involves carefully managing the performance, availability and user experience of software applications, in particular micro-served based applications deployed in a cloud-computing environment. Using APM-based tools, software developers for microservice-based applications monitor different aspects of the software they develop by instrumenting the software. These aspects include performance of the software, disk utilization of the software, CPU utilization of the software, errors encountered during execution of the software, significant events encountered during execution of the software, and/or information describing which parts of code are being executed and which parts are not being executed, among others. After development, similar aspects of the software are also monitored during production, such as when software is being executed in a cloud architecture.

A critical aspect of APM involves gauging user experience, including key metrics, such as the load time of a particular website. Real User Monitoring (RUM) (also referred to as real user measurement or end-user experiencing monitoring) is a type of passive performance monitoring that captures and analyzes each transaction by users of a website or an application (e.g., a cloud-based microservices-based application). Monitoring actual user interaction with a website or an application is important to operators (e.g., site reliability engineering teams or developer teams of a website or a cloud-based application) to determine if users are being served quickly and without errors and, if not, which part of a business process is failing. SaaS and application service providers use RUM to monitor and manage service quality delivered to their clients and to detect errors or slowdowns on web sites.

Typically, in RUM, a location of a device (e.g., a desktop computer, a server) can be obtained via IP geolocation techniques, i.e., a mapping of an IP address to a geographic location of the internet from the connected device. Via the IP geolocation technique, the mapping of the IP address provides location information, such as the country, state, city, zip code, ISP, area code, and other information. However, mobile devices do not map their IP addresses in a way that allows for IP geolocation. Thus, with regard to mobile devices (e.g., cellphones), one has to rely on the latitude-longitude information to determine the location of the mobile device. It is appreciated that the latitude-longitude co-ordinates of a mobile device correspond to a position of the mobile device represented in a spherical or ellipsoidal co-ordinate system. In such a co-ordinate system, one has to use the great-circle distance formula to compute a distance between the location of the mobile device and another predetermined location. The great circle formula involves multiple computational functions (e.g., trigonometric functions) to compute the distance. In applications where multiple such distances are to be computed in real-time, such an approach proves to be computationally expensive and thus infeasible.

Embodiments described herein address these and other problems, individually and collectively.

BRIEF DESCRIPTION OF THE DRAWINGS

Features, implementations, and advantages of the present disclosure are better understood when the following Detailed Description is read with reference to the accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Real user monitoring (RUM) is the practice of using data from an application or website's real-life users to monitor and understand application performance. RUM tracks metrics, such as DNS timing, time-to-first-byte, full-page load time, JavaScript errors and the time it takes to load specific elements. These metrics are collected by monitoring actual user sessions. By monitoring real-user data across a variety of end-user configurations, browser versions, operating systems, feature flags, user status, locations, etc., software delivery and reliability teams can identify problems that negatively impact the user's digital experience and user satisfaction. RUM is a specific type of application monitoring that relies on the passive collection of data produced by real users in order to identify application availability or performance issues. RUM provides insights that are difficult to achieve through other performance monitoring techniques because it synthesizes and reports on data collected from actual human users. RUM may be used to monitor activity and provide visibility all the way from the browser through the network down to the backend services.

In RUM, streams of metric time series data may provide clients with valuable real-time information pertaining to webpages (e.g. metrics related to accessing a particular internet resource) and allow alerts to be configured to manage anomalous behavior associated with the webpages. Note that as used herein, the term "users" refers to real-life users of an application or website, whereas the term "client" refers to a frontend developer of the application or website or site reliability engineer (associated with the application or website). For instance, referring to FIG. 1, mobile devices 107A-107D correspond to users that utilize a service (e.g., an application 109) provided by a service provider 105 (i.e., the client). The client may use a monitoring platform (e.g. monitoring service 606 of FIG. 6) to monitor the interactions of the real-life users with the application or website.

Figure 1:
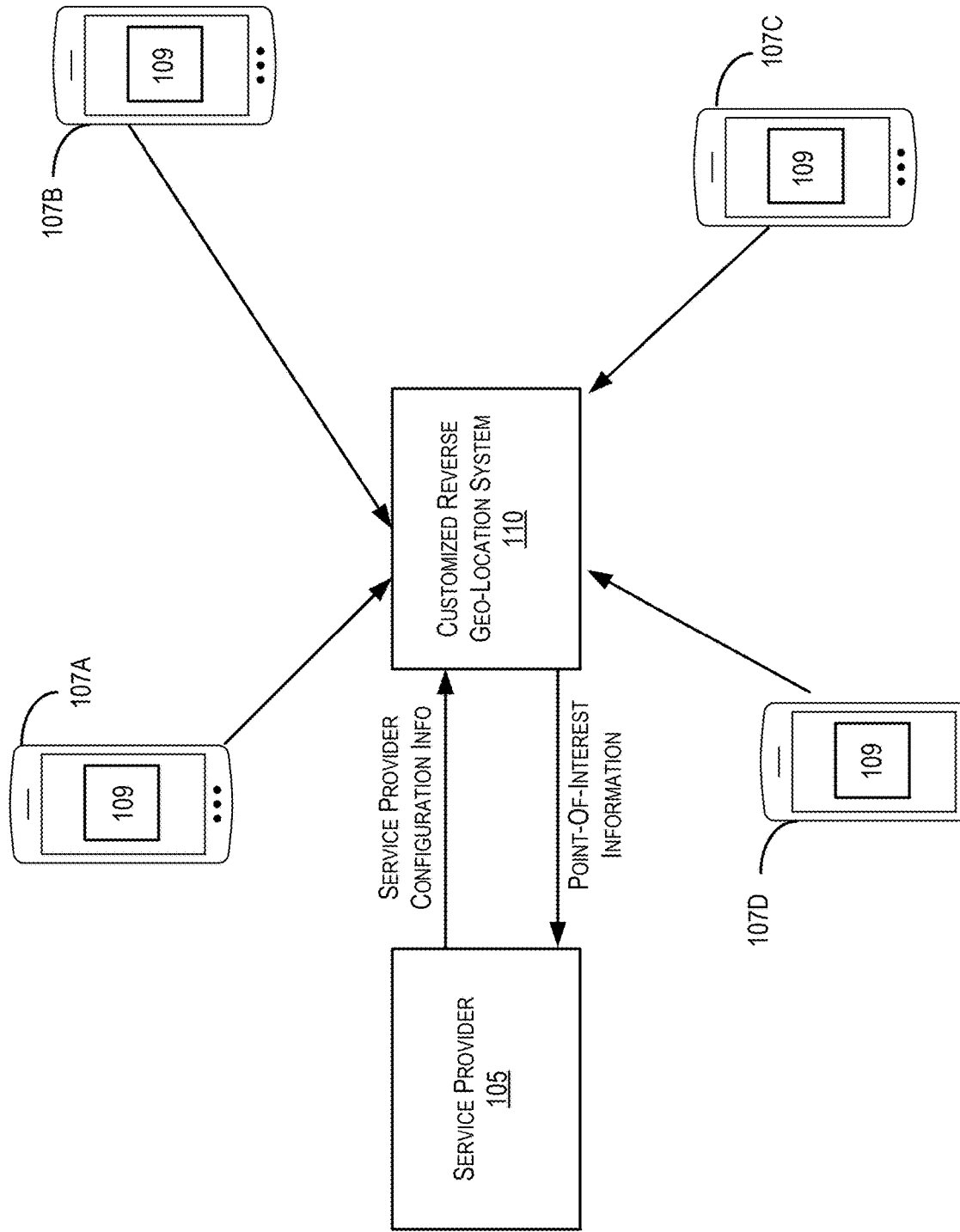
FIG. 1 is a simplified diagram of a distributed environment incorporating a customized reverse geolocation system, according to certain embodiments.
Figure 2:
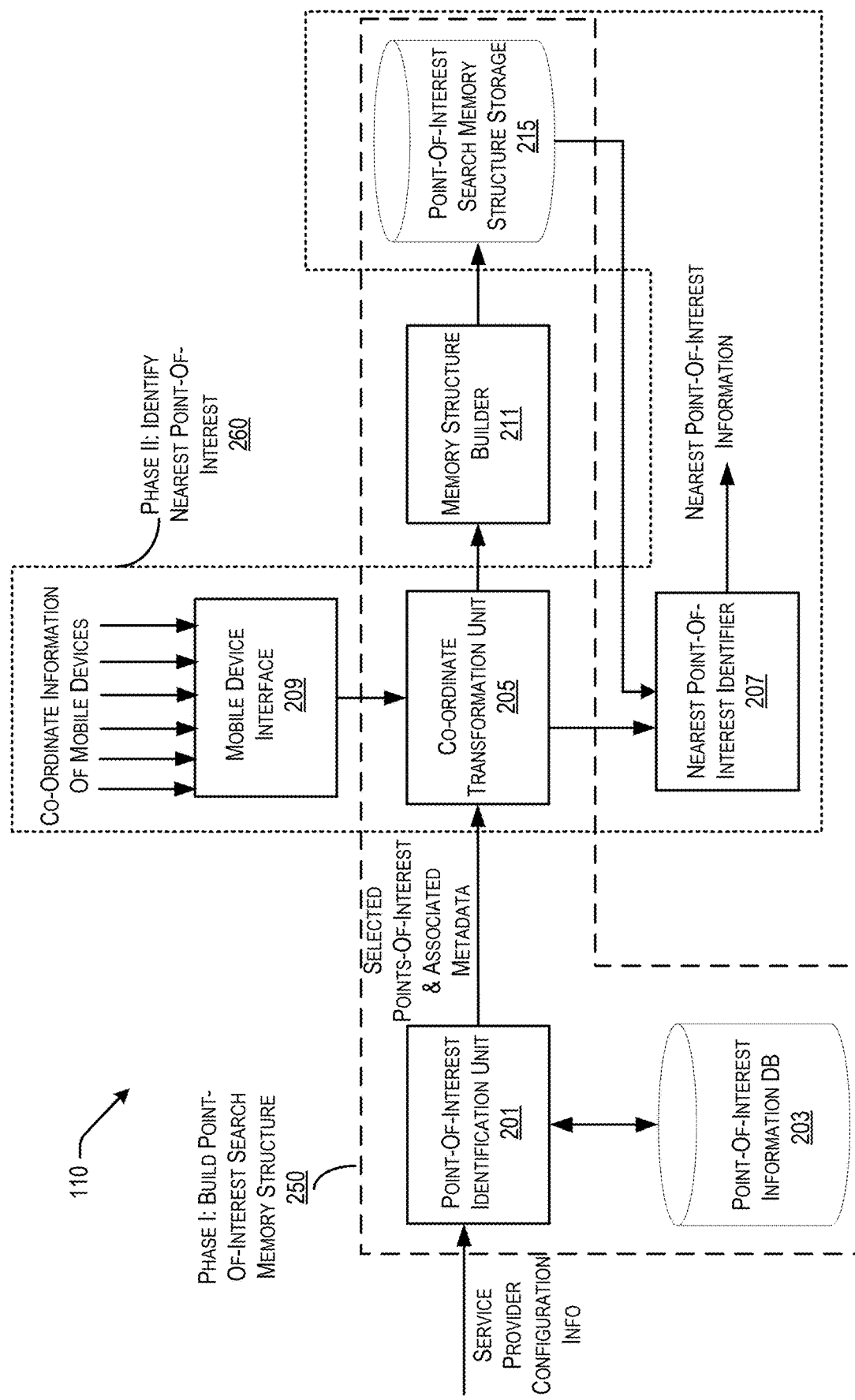
FIG. 2 depicts a block diagram of a customized reverse geolocation system, according to certain embodiments.

A naive approach for obtaining information pertaining to the location of the mobile devices is to rely on the latitude-longitude co-ordinates of the mobile devices. The latitude-longitude co-ordinates of a mobile device correspond to a position of the mobile device represented in a spherical or ellipsoidal co-ordinate system. In such a co-ordinate system, one has to use the great-circle distance formula to compute a distance (e.g., shortest distance between two points on the surface of a sphere) between the location of the mobile device and another predetermined location. The great circle formula involves multiple computational functions (e.g., trigonometric functions) to compute the distance. As such, the great circle formula becomes computationally expensive when one is processing large numbers of requests per second. Described next with reference to FIG. 1 and FIG. 2, is a customized reverse geo-location system that determines a location of mobile device and computes, in real-time, a distance between the location of the mobile device and a point-of-interest (e.g., nearest to the mobile device) in a fast and seamless manner. Moreover, the computations performed by the reverse geo-location system can be easily scaled to accommodate a large number of requests e.g., millions of requests per minute.

FIG. 1 is a simplified diagram of a distributed environment incorporating a customized reverse geolocation system according to certain embodiments. The distributed environment includes a service provider 105, a customized reverse geo-location system 110, and a plurality of mobile devices e.g., mobile devices 107A, 107B, 107C, and 107D that are geographically dispersed. By some embodiments, the service provider 105 provides a service that is utilized by each of the mobile devices. For instance, the service may correspond to an application 109 that is executed by each of the mobile devices. The service provider 105 may utilize a monitoring platform (e.g. monitoring service 606 of FIG. 6) to monitor the interactions of the real-life users with the application 109. Moreover, the service provider 105 utilizes the customized reverse geo-location system 110 to identify, in a fast manner, the geographical location(s) of the mobile devices, as well as points-of-interest that are geographically close to the geographical location(s) of the mobile devices.

By some embodiments, the service provider 105 transmits configuration information to the customized reverse geo-location system 110. Configuration information may include information pertaining to a level of granularity of the points-of-interest as desired by the service provider 105. The points-of-interest may include country, state/region, zip code, cities, etc. In other words, the configuration information includes information related to a type or category of the points-of-interest desired by the service provider 105. In response to receiving the configuration information, the customized reverse geo-location system 110 can output information pertaining to the one or more points-of-interest that are geographically close to the geographical location of each of the mobile devices 107A-107D. Details pertaining to the operation of the customized reverse geo-location system 110 are described next with reference to FIG. 2.

Turning to FIG. 2, a block diagram is depicted of a customized reverse geolocation system 110 according to certain embodiments. The customized reverse geolocation system 110 includes a point-of-interest identification unit 201, a point-of-interest information database (DB) 203, a co-ordinate transformation unit 205, a nearest point-of-interest identifier 207, a mobile device interface 209, a memory structure builder 211, and a point-of-interest search memory structure storage 215.

According to some embodiments, the customized reverse geolocation system 110 is configured to operate in one of two phases or modes of operation. A first phase of operation is referred to as a 'building point-of-interest search memory structure' phase, and a second phase of operation is referred to as 'identifying nearest point-of-interest' phase. In the first phase, the customized reverse geolocation system 110 builds point-of-interest search memory structures and stored them in a storage unit. In the second phase, the pre-built point-of-interest search memory structures are utilized for identifying nearest point(s)-of-interest with respect to a location of a mobile device(s).

The components of the customized reverse geolocation system 110 used in the two phases of operation are depicted in FIG. 2 by dashed and dotted boxes, respectively. For instance, in the 'building point-of-interest search memory structure' (i.e., the first phase) 250, the components of the customized reverse geolocation system 110 used are the point-of-interest identification unit 201, the point-of-interest information database (DB) 203, the co-ordinate transformation unit 205, the memory structure builder 211, and the point-of-interest search memory structure storage 215. In the 'identifying nearest point-of-interest' phase 260, the components of the customized reverse geolocation system 110 used are the mobile device interface 209, the co-ordinate transformation unit 205, the nearest point-of-interest identifier 207, and the point-of-interest search memory structure storage 215. In what follows, the operations of the two phases are described in detail.

In the first phase of operation of the customized reverse geolocation system 110 (i.e., the 'building point-of-interest search memory structure' phase), the point-of-interest identification unit 201 receives configuration information from a service provider (e.g., service provider 105 of FIG. 1). The configuration information includes information pertaining to the level of granularity of the points-of-interest as desired by the service provider (i.e., the category or type of points-of-interest desired by the service provider). The points-of-interest may include country, state/region, zip code, cities, etc. In other words, the configuration information is indicative of the level of granularity desired with respect to measuring distances (i.e., a distance measure) between the one or more points-of-interest and the geographical locations of the mobile devices (e.g., mobile devices 107A-107D).

In response to receiving the configuration information, the point-of-interest identification unit 201 selects one or more points-of-interest (and associated metadata) from the point-of-interest database 203. In one implementation, the metadata associated with each point-of-interest includes geographical co-ordinate information in a first format (e.g., latitude-longitude information of the points-of-interest). The geographical co-ordinate information of the points-of-interest in the first format (i.e., latitude-longitude co-ordinates) is transmitted by the point-of-interest identification unit 201 to the co-ordinate transformation unit 205.

The co-ordinate transformation unit 205 of the reverse geolocation system 110 transforms the co-ordinates of the points-of-interest from the first format to a second format. For instance, the co-ordinate transformation unit 205 transforms the latitude-longitude information (i.e., information in the first format) to a pair of Cartesian co-ordinates (x-y co-ordinates) i.e., information in the second format by performing a Mercator projection. The Mercator projection is a cylindrical map projection that transforms co-ordinates of a position from a spherical or ellipsoidal co-ordinate system (e.g., latitude-longitude co-ordinates) to a two-dimensional Cartesian co-ordinate system (e.g., x-y co-ordinate system).

In executing the Mercator projections, it is noted that one may incur a minimal loss of accuracy in co-ordinate transformations, which largely occur in transforming co-ordinates disposed near the poles (i.e., north pole or south pole). It is appreciated that as there are few to none points-of-interest near the polar regions, the loss of accuracy is next to negligible. Further, it is noted that the advantage offered by the Mercator projections (at the expense of some loss of accuracy) is that one can circumvent using the great circle technique in distance computations. The great circle technique involves multiple computational functions (e.g., trigonometric functions) to compute distances. In applications where multiple such distances are to be computed in real-time, such an approach proves to be computationally expensive and thus infeasible. Rather, by using Mercator projections, the Cartesian co-ordinates of positions could be used in a seamless and quick manner to compute distances (e.g., Euclidean distance) in real time in a scalable manner. Additionally, it is appreciated that in some implementations, when the service provider selects configuration information to correspond to 'large' points-of-interest (e.g., cities), an automatic data anonymization of the locations of the mobile devices (e.g., personally identifiable information) is achieved.

The transformed co-ordinates (i.e., x-y co-ordinates) output by the co-ordinate transformation unit 205 are processed by the memory structure builder 211. The memory structure builder 211 of the reverse geolocation system 110 constructs a data structure (referred to herein as a point-of-interest search structure), such as supplemental R tree based on the Cartesian co-ordinates of the points-of-interest. It is noted that for the different granularities (i.e., categories) of the configuration information (e.g., city, state, zip code), the memory structure builder 211 constructs the corresponding point-of-interest search structure (i.e., supplemental R tree) a single time. Furthermore, such a construction of the supplemental R tree can be performed in an order of time that is less than one second for 15,000 points-of-interest. The constructed point-of-interest search memory structure is stored in the point-of-interest search memory structure storage 215.

Supplemental R trees are tree data structures used for spatial access methods, i.e., for indexing multi-dimensional information such as geographical coordinates, rectangles or polygons. Such data structures may store spatial objects e.g., restaurant locations or the polygons that typical maps are made of such as streets, buildings, outlines of lakes, coast-lines, etc. The data structures are utilized to obtain answers to queries such as 'find all museums within 2 km of my current location', 'retrieve all road segments within 2 km of my location', or "find the nearest gas station". The supplemental R-tree can also accelerate nearest neighbor search for various distance metrics (e.g., Euclidean distance).

The key idea of the data structure is to group nearby objects and represent them with their minimum bounding rectangle in the next higher level of the tree. Since all objects lie within this bounding rectangle, a query that does not intersect the bounding rectangle also cannot intersect any of the contained objects. At the leaf level, each rectangle describes a single object. At higher levels the aggregation includes an increasing number of objects. With regard to performing a search operation using the supplemental R tree, the key idea is to use the bounding boxes to decide whether to search inside a subtree. In this way, most of the nodes in the tree are not read during a search, thereby making the search efficient and fast. For instance, in one embodiment, the search starts from the root node of the tree. Every internal node contains a set of rectangles and pointers to the corresponding child node and every leaf node contains the rectangles of spatial objects. For every rectangle in a node, it has to be decided if it overlaps the search rectangle or not. If yes, the corresponding child node has to be searched as well. Searching is performed in a recursive manner until all overlapping nodes have been traversed. When a leaf node is reached, the contained bounding boxes (rectangles) are tested against the search rectangle and their objects (if there are any) are put into the result set if they lie within the search rectangle.

In another implementation, for instance performing a priority search such as a nearest neighbor search, the query consists of a point or rectangle. The root node is inserted into the priority queue. Until the queue is empty or the desired number of results have been returned, the search continues by processing the nearest entry in the queue. Tree nodes are expanded and their children reinserted. Leaf entries are returned when encountered in the queue. Thus, upon completion of the first phase of operation of the customized reverse geolocation system 110, one or more points-of-interest search memory structures are build and stored in the point-of-interest search memory structure storage 215. It is noted that the supplemental R tree is used as the data storage structure (for the geolocation information of the points-of-interest) in one implementation. However, in other implementations, other data structures can be used to store geolocation information of the points-of-interests. For instance, in some implementations, either a Ball tree or a K-D tree (i.e., a K dimensional tree) may be utilized to store geolocation information of the points-of-interests.

In the second phase of operation of the customized reverse geolocation system 110, the mobile device interface 209 of the customized reverse geolocation system 110 receives latitude-longitude co-ordinates (i.e., geographical location information in a first format) of one or more mobile devices. The mobile device interface 209 transmits the received latitude-longitude co-ordinates to the co-ordinate transformation unit 205. For each mobile device, the co-ordinate transformation unit 205 of the customized reverse geolocation system 110 transforms the geographical location information of the mobile device in the first format to the geographical location information in a second format.

In one implementation, the co-ordinate transformation unit 205 performs a Mercator operation to convert/transform the latitude-longitude co-ordinates of the mobile device to a Cartesian co-ordinate pair (i.e., x-y co-ordinates, which corresponds to the second format). The transformed co-ordinates of the mobile device (i.e., co-ordinates in the second format) are transmitted to the nearest point-of-interest identifier 207. The nearest point-of-interest identifier 207 retrieves a point-of-interest search memory structure (i.e., a supplemental R tree) including x-y co-ordinates of the points-of-interest stored therein. It is appreciated that a desired category (e.g., country, state/region, zip code, cities, etc.) of the point-of-interest search memory structure can be retrieved from the point-of-interest search memory structure storage 215. Using the co-ordinates of the mobile device (in the second format i.e., x-y co-ordinates) as an input, the nearest point-of-interest identifier 207 performs a search operation with respect to the point-of-interest search memory structure to identify a point-of-interest that is closest to the geographical location of the mobile device. By some embodiments, the nearest point-of-interest identifier 207 may identify more than one points-of-interest (e.g., a first nearest point-of-interest, a second nearest point-of-interest). It is appreciated that by utilizing supplemental R tree as the point-of-interest search memory structure, a search operation to identify, for instance, the nearest point-of-interest to the mobile device can be performed by comparing Euclidean distances of the points-of-interest to the location of the mobile device. By some embodiments, for a supplemental R tree including 15000 points-of-interest, an average of 2-5 comparisons are required to identify the nearest point-of-interest.

Figure 6:
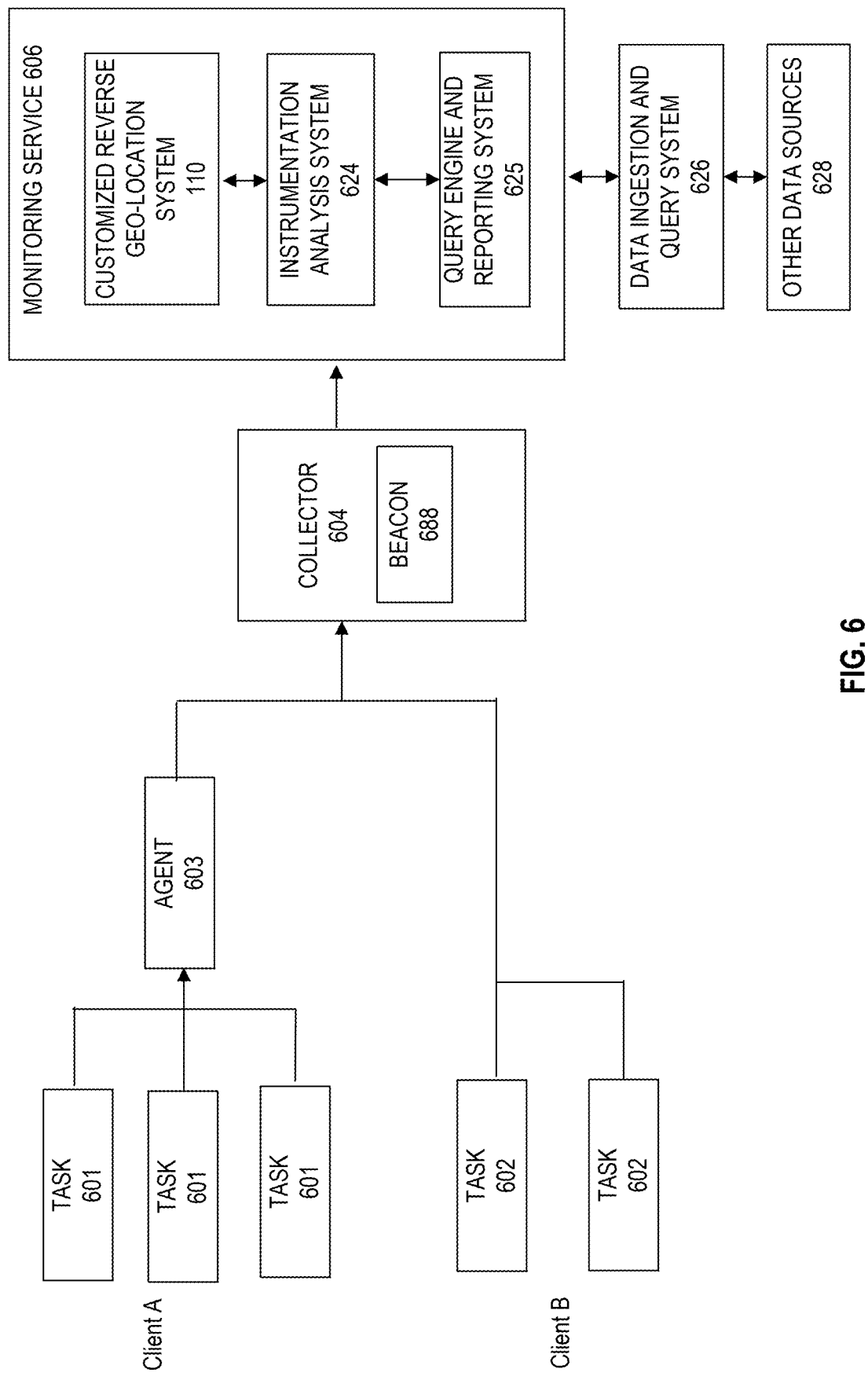
FIG. 6 illustrates a block diagram depicting a manner in which data is collected and ingested for further analysis within a computer system, in accordance with implementations of a monitoring service as disclosed herein.

By some embodiments, the nearest point-of-interest identifier 207 transmits information pertaining to the identified nearest points-of-interest as well as the location of the mobile device to an analytical server (e.g., instrumentation analysis system 624 of FIG. 6). The analytical server may compute a distance i.e., Euclidean distance between the geographical position of each of the one or more points-of-interest and the geographical location of the mobile device, and transmit the result of the computation to the service provider. Additionally, the analytical server may also perform computations with respect to a configurable threshold distance (with respect to a point-of-interest) e.g., 200 miles, to identify whether or not a particular mobile device is within the configurable threshold distance. The analytical server may also be configured to transmit alert/warning signals to notify the service provider regarding the location of the mobile device e.g., when the mobile device is disposed at a distance (with respect to the point-of-interest) that is greater than the configurable threshold distance. It is noted that the above-described embodiments of the customized reverse geolocation system 110 are in no way limiting the scope of the present disclosure. In certain alternative implementations, the customized reverse geolocation system 110 may be configured to perform the functionalities of the analytical server e.g., distance computations.

Figure 3:
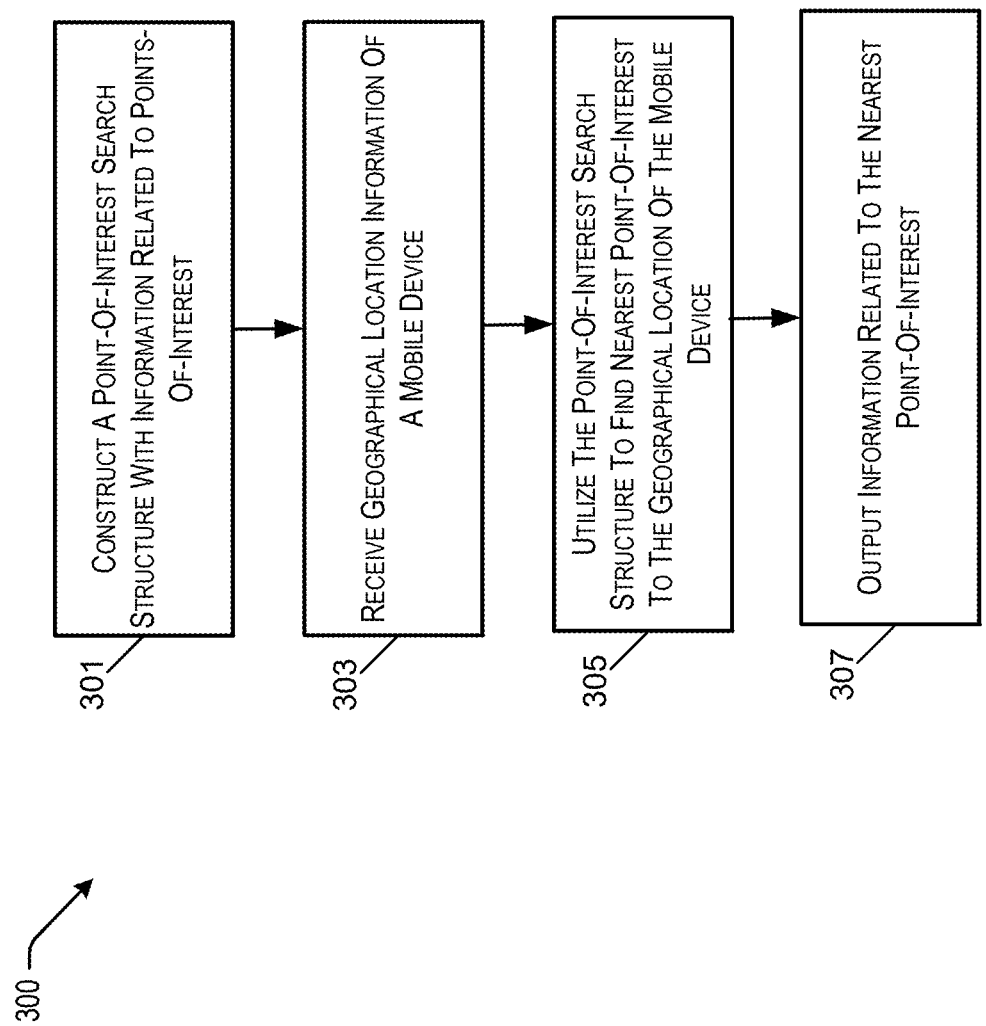
FIG. 3 is a flowchart illustrating a high-level process performed by the customized reverse geolocation system, according to certain embodiments.

FIG. 3 is a flowchart illustrating a high-level process performed by the customized reverse geolocation system according to certain embodiments. The processing depicted in FIG. 3 may be implemented in software (e.g., code, instructions, program) executed by one or more processing units (e.g., processors, cores) of the respective systems, using hardware or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel. In certain embodiments, the processing depicted in FIG. 3 may be performed by reverse geolocation system 110 of FIG. 2.

The process commences in step 301, where the reverse geolocation system constructs a point-of-interest search structure with information related to the points-of-interest. For instance, referring to FIG. 2, based on the configuration information received from the service provider, the point-of-interest identification unit 201 selects one or more points-of-interest (and associated metadata) from the point-of-interest database 203. The metadata associated with each point-of-interest includes geographical co-ordinate information e.g., latitude-longitude information. The co-ordinate transformation unit 205 of the reverse geolocation system transforms the co-ordinates of the points-of-interest from a first format to a second format. For instance, the co-ordinate transformation unit 205 transforms the latitude-longitude information (i.e., information in the first format) to a pair of Cartesian co-ordinates (x-y co-ordinates) i.e., information in the second format by performing a Mercator projection. The memory structure builder 211 of the reverse geolocation system constructs the point-of-interest search structure (e.g., a supplemental R tree) based on the Cartesian co-ordinates of the points-of-interest.

In step 303, the reverse geolocation system receives geographical location information of a mobile device. In step 305, the reverse geolocation system utilizes the point-of-interest search structure constructed in step 301 to find a nearest point-of-interest to the geographical location of the mobile device. The process thereafter proceeds to step 307, where the reverse geolocation system outputs information related to the point-of-interest determined in step 305. In one implementation, the reverse geolocation system can output the Cartesian co-ordinates of the point-of-interest found in step 305 to a service provider. Additionally or alternatively, the reverse geolocation system may output information related to the point-of-interest to an analytical server in order to enable the analytical server to perform further analysis related to the mobile device and the point-of-interest.

Figure 4:
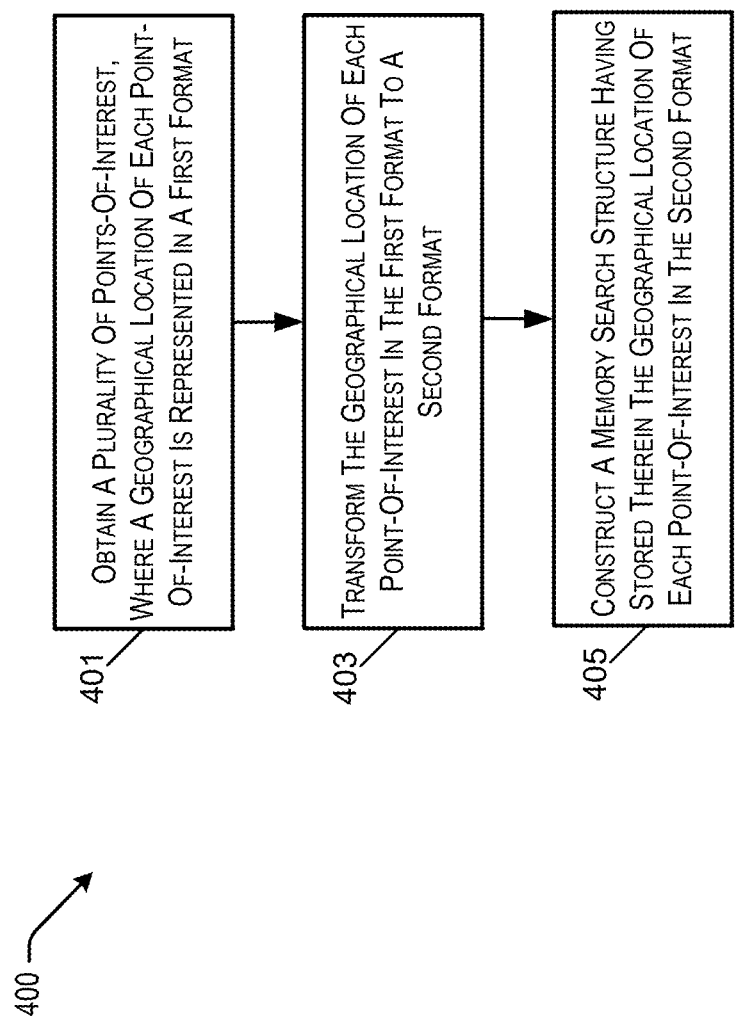
FIG. 4 is a flowchart illustrating an example process of constructing a memory search structure, according to certain embodiments.

FIG. 4 is a flowchart illustrating an example process of constructing a memory search structure according to certain embodiments. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. In certain embodiments, the processing depicted in FIG. 4 may be performed by the co-ordinate transformation unit 205 and the memory structure builder 211 of FIG. 2.

The process commences in step 401, where the co-ordinate transformation unit 205 receives selected points-of-interest (and associated metadata) from the points-of-interest identification unit 201. For instance, the point-of-interest identification unit 201 selects one or more points-of-interest (and associated metadata) from the point-ofinterest database 203 based on configuration information received from the service provider. The metadata associated with each point-of-interest includes geographical co-ordinate information in a first format e.g., latitude-longitude information.

In step 403, the co-ordinate transformation unit 205 of the reverse geolocation system transforms the co-ordinates of the points-of-interest from the first format to a second format. For instance, the co-ordinate transformation unit 205 transforms the latitude-longitude information (i.e., information in the first format) to a pair of Cartesian co-ordinates (x-y co-ordinates) i.e., information in the second format by performing a Mercator projection. Thereafter, the process moves to step 405 where the memory structure builder 211 of the reverse geolocation system constructs the point-of-interest search structure based on the Cartesian co-ordinates of the points-of-interest. In one implementation, the memory structure builder 211 is configured to construct a supplemental R tree based on the Cartesian co-ordinates of the points-of-interest.

Figure 5:
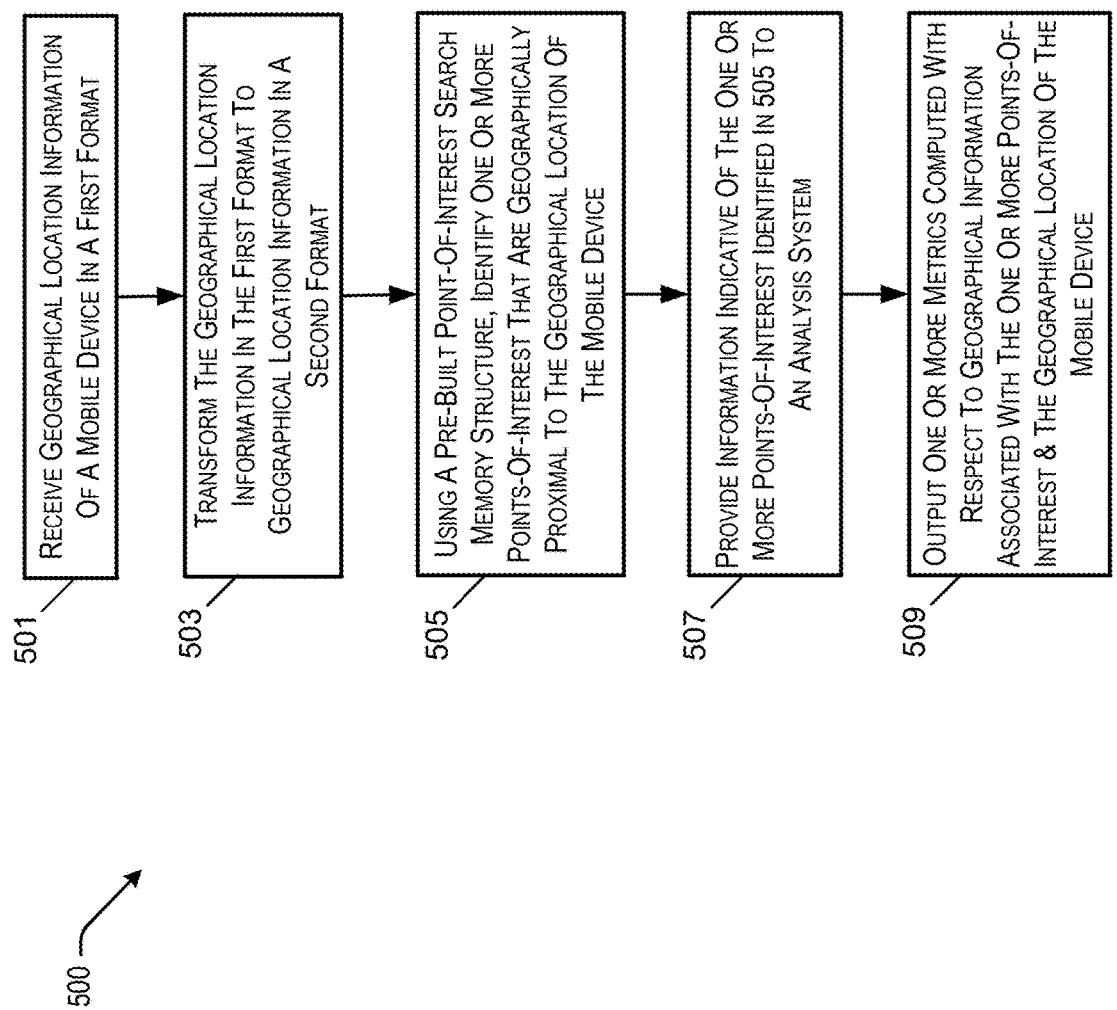
FIG. 5 is a detailed flowchart illustrating steps performed by the customized reverse geolocation system, according to certain embodiments.

FIG. 5 is a detailed flowchart illustrating steps performed by the customized reverse geolocation system according to certain embodiments. The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). Although FIG. 5 depicts the various processing steps occurring in a particular sequence or order, the method presented in FIG. 5 and described below is intended to be illustrative and non-limiting. In certain alternative embodiments, the processing may be performed in some different order or some steps may also be performed in parallel. In certain embodiments, the processing depicted in FIG. 5 may be performed by the customized reverse geolocation system 110 as depicted in FIG. 2.

The process commences in step 501, where the customized reverse geolocation system receives geographical location information of a mobile device in a first format. For instance, referring to FIG. 2, the mobile device interface 209 of the customized reverse geolocation system receives latitude-longitude co-ordinates (i.e., geographical location information in the first format) of a mobile device. The mobile device interface 209 transmits the received latitude-longitude co-ordinates to the co-ordinate transformation unit 205.

In step 503, the co-ordinate transformation unit 205 of the customized reverse geolocation system transforms the geographical location information of the mobile device in the first format to geographical location information in a second format. In one embodiment, the co-ordinate transformation unit 205 performs a Mercator operation to convert/transform the latitude-longitude co-ordinates of the mobile device to a Cartesian co-ordinate pair (i.e., x-y co-ordinates, which corresponds to the second format).

The process then moves to step 505, where the customized reverse geolocation system identifies one or more points-of-interest that are geographically proximal to the geographical location of the mobile device. For instance, by one implementation, the nearest point-of-interest identifier 207 of the customized reverse geolocation system retrieves a point-of-interest search memory structure (e.g., a supplemental R tree) from the point-of-interest search memory structure storage 215. It is noted that the point-of-interest search memory structure is pre-built (with location information of points-of-interest in the second format) and stored in point-of-interest search memory structure storage 215 based on the processing described previously with reference to FIG. 4.

Further, the nearest point-of-interest identifier 207 receives the transformed co-ordinates (i.e., the Cartesian co-ordinates) of the mobile device from the co-ordinate transformation unit 205. Using the Cartesian co-ordinates of the mobile device as an input, the nearest point-of-interest identifier 207 performs a search operation with respect to the point-of-interest search memory structure to identify a point-of-interest that is proximal to the geographical location of the mobile device. It is appreciated that the nearest point-of-interest identifier 207 may identify one or more points-of-interest that are proximal to the geographical location of the mobile device e.g., a first proximal point-of-interest (i.e., closest), a second proximal point-of-interest (i.e., second closest) with respect to the geographical location of the mobile device.

In step 507, the nearest point-of-interest identifier 207 provides information indicative of the one or more points-of-interest identified in step 505 to an analysis system (e.g., an analytical server). For instance, the nearest point-of-interest identifier 207 provides the Cartesian co-ordinates of the one or more points-of-interest to the analysis system (e.g., an instrumentation and analysis system 624 of FIG. 6) for further processing. As will be described later with reference to FIG. 6, the customized reverse geolocation system and the instrumentation and analysis system 624 may be included in a monitoring service 606. In step 509, one or more metrics computed with respect to the geographical information associated with the one or more points-of-interest and the geographical location of the mobile device may be output to a service provider. The one or more metrics may include, for instance, a first metric indicating a distance (s) e.g., Euclidean distance, between the geographical location of the mobile device and the one or more points-of-interest, a second metric indicative of whether the mobile device is within a threshold distance from a region of interest, and the like.

FIG. 6 illustrates a block diagram depicting a manner in which data is collected and ingested for further analysis within a computer system, in accordance with implementations of a monitoring service as disclosed herein. Tasks 601 represent client applications that execute within a client data center for Client A. Similarly, tasks 602 represents client applications that execute within a client data center for Client B. In one implementation, the tasks 601 or 602 may comprise services or applications within a client's on-premises ("on-prem") software. Alternatively, they may comprise services or applications running in the cloud-computing environment. Moreover, the tasks 601 or 602 may correspond to a service (i.e., an application provided by a service provider) that is executed on a plurality of geographically-dispersed mobile devices.

It should be noted that while the tasks 601 and 602 may comprise instrumented application software, the techniques disclosed herein are not limited to application software but are applicable to other kinds of software; for example, server software, software executing on customer devices, websites, and so on. Furthermore, a client device (e.g., a device at a data center for Client A or Client B) may include any computing system that is configured to execute instrumented software, whether or not it is used for development of improved software. For example, the client device may be a computing system used for testing purposes, staging purposes, or any production system executing in an enterprise.

An agent 603 is typically configured at the client-side host or service for receiving data collected from the various tasks on the client-side and transmitting the data to a collector 604. An agent may receive generated data locally using, for example, User Datagram Protocol (UDP). The tasks 602 may comprise instrumented tasks that are not using an agent and may be configured to send directly to the collector 604. The tasks may include various front-end tasks, such as those performed by a web browser running on a client's device. While data may be collected from the client-side tasks without configuring an agent (e.g., in the case of Client B), using an agent may provide benefits including batching, buffering, and updating data libraries.

Batches of data collected by the agent 603 are periodically received at the collector 604. The collector 604 may be implemented within a client's on-prem software or in the cloud-computing environment. The collector 604 may also, for example, be implemented in a cloud-computing environment by the same entity as the one implementing monitoring service 606. The collector 604 may avoid redundancies by sampling the data before processing and storing it. The collector 604 runs the data through a processing pipeline and may store it in a specified storage or analytics backend, such as a monitoring service 606. It should be noted that the collector 604 may interact with the monitoring service 606 through a network (not shown). In one implementation, the collector 604 may consolidate data from several client devices and combine the data to send to the monitoring service 606 (e.g., without sampling). For example, the collector 604 may comprise a server that receives data streams internally from different client devices and, periodically, sends the combined data (in batch form) to the monitoring service 606.

In one implementation, the collector 604 may comprise a beacon module 688 configured to collect all data associated with RUM sessions (e.g., users' browsing sessions, users' interactions with an application or data generated by users' web browsers). The beacon module 688 may, for example, be configured to collect data generated by browser instrumentation configured on a client's device or a client's web-browser. The beacon may, among other functions, enrich the data generated at the frontend (e.g., by a browser) with additional information (e.g., with HTTP client's IP address, latitude-longitude co-ordinates of the client's device) before forwarding the information to be ingested by the monitoring service 606. Note that the beacon module 688 may not necessarily be a component within the collector 604 but may also be implemented as a standalone module. Further note that similar to the collector 604, the beacon module 688 may be implemented within a client's on-premise software or in the cloud-computing environment (e.g., in the same environment in which monitoring service 606 is implemented).

In an implementation, the monitoring service 606 receives and analyzes the data for monitoring and troubleshooting purposes. It should be noted that, in addition to monitoring service 606, data may also be simultaneously transmitted to other types of storage and monitoring back-end services, e.g., a data ingestion and query system 626. In one implementation, the monitoring service 606 may be a Software as a Service (SaaS)-based service offering. Alternatively, in another implementation, it may also be implemented as an on-premise application. The monitoring service 606 receives the data collected by the collector 604 and provides critical insights into the collected data to a client of the monitoring service, who may be an application owner or developer, a service provider or the like. In an implementation, the monitoring service 606 may be hosted on a computing system that includes one or more processors, memory, secondary storage and input/output controller. The computing system used for hosting the monitoring service 606 may be a server class system that uses powerful processors, large memory resources, and fast input/output systems.

The monitoring service 606 may comprise an instrumentation analysis system 624 (also referred to herein as an "analytics engine"), the customized reverse geolocation system 110, and a query engine and reporting system 625. In one implementation, the instrumentation analysis system 624 receives data sent by different clients. The tasks (or software) executing on the client device are configured to send information generated as a result of instrumenting the software to the instrumentation analysis system 624 of the monitoring service 606. For example, the tasks may send data collected from the various services at the client end to the instrumentation analysis system 624. Alternatively, data may be sampled to generate metric values, and the tasks may send values corresponding to various metrics as they are generated to the instrumentation analysis system 624. The tasks may send group values of metrics periodically to the instrumentation analysis system 624. Different tasks may send the same metric or different metrics at different rates. The same task may send different metrics at different rates. In one implementation, the customized reverse geolocation system 110 (as described previously with reference to FIG. 2) may transmit information indicative of the points-of-interest to the instrumentation analysis system 624 for further processing. For instance, the instrumentation analysis system 624 may be configured to compute proximal distances of the points-of-interest with respect to a geographical location of a mobile device.

In an implementation, the tasks (e.g., tasks 601 and 602) and the collector 604 may send data to the monitoring service 606 by invoking an API supported by the monitoring service 606 and the instrumentation analysis system 624. In one implementation, a customer name may be specified for the instrumented software. The instrumented software includes the customer name when it identifies a data stream associated with that particular customer. The ability to associate a data stream with a customer allows the instrumentation analysis system 624 to perform customer specific analysis; for example, report on usages of systems for each customer, and identify customers reporting more than a threshold number of errors and so on.

In one implementation, an application owner, developer, or a service provider (e.g., service provider 105 of FIG. 1) may submit queries to the query engine and reporting system 625 to gain further insight into data received and analyzed by the instrumentation analysis system 624. For example, the query engine and reporting system 625 within the monitoring service 606 may be configured to generate reports, render graphical user interfaces (GUIs), and/or other graphical visualizations to represent data received from the various clients. The query engine and reporting system 625 may, for example, interact with the instrumentation analysis system 624 to generate a visualization, e.g., a histogram or an application topology graph to represent information regarding the data received from a client. Alternatively, the query engine and reporting system 625 may be configured to respond to specific statistical queries submitted by a developer or service provider regarding one or more services within a client's application e.g., obtaining a graphical representation of the proximal points-of-interest with respect to the location of the mobile device.

Figure 7:
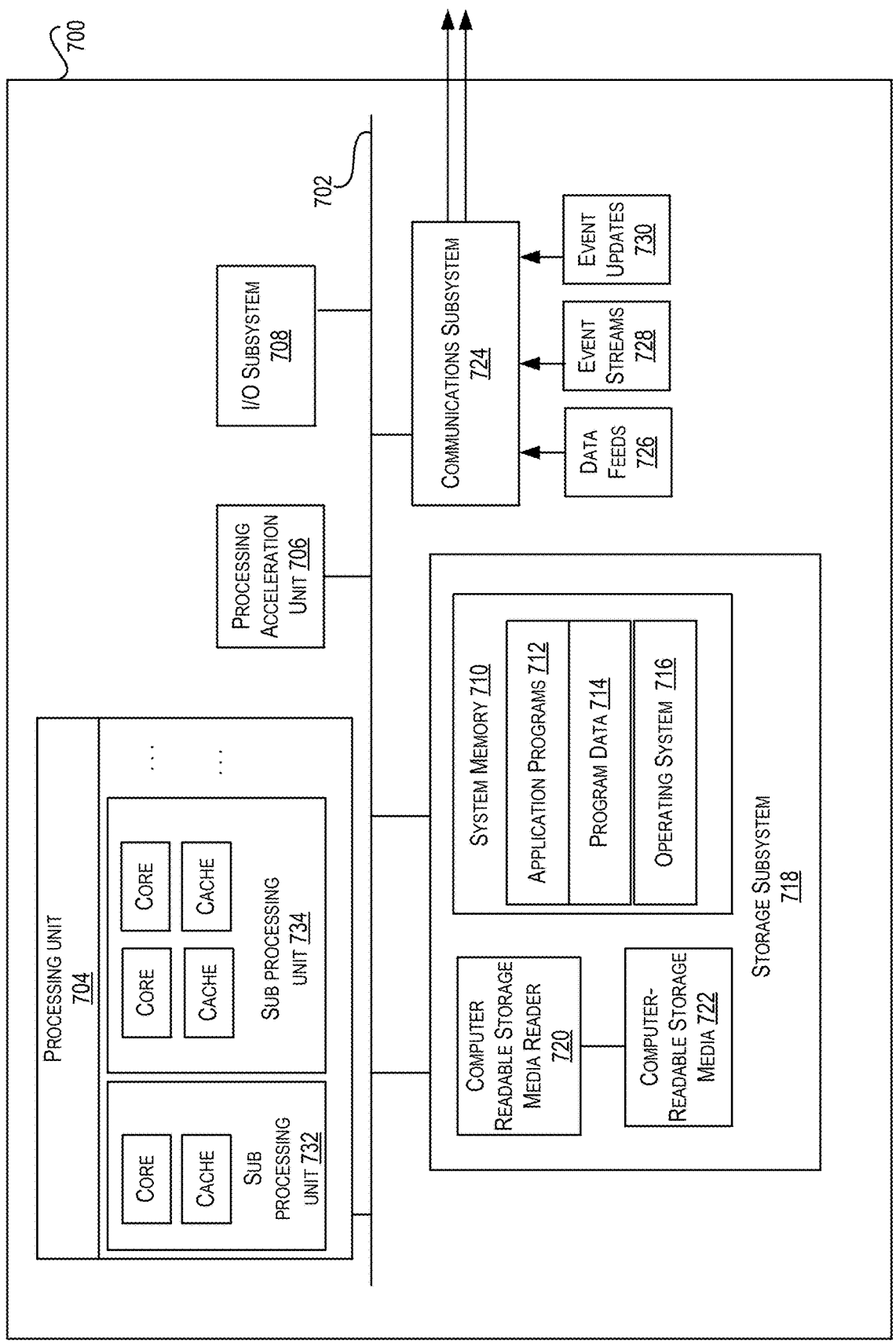
FIG. 7 is a block diagram illustrating an example computer system, according to at least one embodiment.

FIG. 7 illustrates an example computer system 700 that may be used to implement various embodiments. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 732 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently-executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices, such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices, such as the Microsoft Kinect® motion sensor that enables users to control and interact with an input device, such as the Microsoft Xbox® 360 game controller, through a natural user interface using gestures and spoken commands. User interface input devices may also include eye gesture recognition devices, such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator) through voice commands.

User interface input devices may also include, without limitation, three dimensional (3D) mice, joysticks or pointing sticks, gamepads and graphic tablets, and audio/visual devices, such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices, such as computed tomography, magnetic resonance imaging, position emission tomography, and/or medical ultrasonography devices. User interface input devices may also include, for example, audio input devices, such as MIDI keyboards, digital musical instruments, and the like.

User interface output devices may include a display subsystem, indicator lights, or non-visual displays, such as audio output devices, etc. The display subsystem may be a cathode ray tube (CRT); a flat-panel device, such as using a liquid crystal display (LCD) or plasma display; a projection device; a touch screen; and the like. In general, use of the term "output device" is intended to include all possible types of devices and mechanisms for outputting information from computer system 700 to a user or other computer. For example, user interface output devices may include, without limitation, a variety of display devices that visually convey text, and graphics and audio/video information, such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700. System memory 710 may be volatile (such as random-access memory (RAM)) and/or non-volatile (such as read-only memory (ROM), flash memory) the RAM typically contains data and/or program modules that are immediately accessible to and/or presently being operated and executed by processing unit 704. In some implementations, system memory 710 may include multiple different types of memory, such as static random-access memory (SRAM) or dynamic random-access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include: client applications, web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems, such as iOS, Windows® Phone, Android® OS, BlackBerry® 12 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor, provide the functionality described above may be stored in storage subsystem 718. These software modules or instructions may be executed by processing unit 704. Storage subsystem 718 may also provide a repository for storing data used in accordance with the present disclosure.

Storage subsystem 700 may also include a computer-readable storage media reader 730 that can further be connected to computer-readable storage media 732. Together and optionally in combination with system memory 710, computer-readable storage media 732 may comprehensively represent remote, local, fixed, and/or removable storage devices plus storage media for temporarily and/or more permanently containing, storing, transmitting, and retrieving computer-readable information.

Computer-readable storage media 732 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media, such as RAM, ROM, electronically erasable programmable ROM (EEPROM), flash memory or other memory technology, CD-ROM, digital versatile disk (DVD), other optical storage, magnetic cassettes, magnetic tape, magnetic disk storage or other magnetic storage devices, other tangible computer readable media. This can also include nontangible computer-readable media, such as data signals, data transmissions, or any other medium which can be used to transmit the desired information and which can be accessed by computing system 700.

By way of example, computer-readable storage media 732 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk, such as a CD ROM, DVD, and Blu-Ray® disk, or other optical media. Computer-readable storage media 732 may include, but is not limited to: Zip® drives, flash memory cards, universal serial bus (USB) flash drives, secure digital (SD) cards, DVD disks, digital video tape, and the like. Computer-readable storage media 732 may also include, solid-state drives (SSD) based on non-volatile memory, such as flash-memory based SSDs, enterprise flash drives, solid state ROM, and the like. SSDs based on volatile memory, such as solid-state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data and transmitting data to other systems from computer system 700. For example, communications subsystem 724 may enable computer system 700 to connect to one or more devices via the Internet. In some embodiments communications, subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services, such as Twitter® feeds, Facebook® updates, web feeds, such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language, such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   transforming geographical location information of a mobile device from a first format to a second format by performing a Mercator projection of the geographical location information in the first format, wherein the first format corresponds to a latitude-longitude information of the mobile device in an ellipsoidal co-ordinate system, and the second format corresponds to a pair of co-ordinates in a Cartesian co-ordinate system;
   identifying, using a point-of-interest search memory structure, one or more points-of-interest from a plurality of points-of-interest that are geographically proximal to a geographical location of the mobile device, wherein the point-of-interest search memory structure is a supplemental R tree and includes geographical location information for the plurality of points-of-interest in the second format; and
   transmitting, to an analytical server, information indicative of the one or more points-of-interest and the geographical location information of the mobile device in the second format to enable the analytical server to perform analysis related to the mobile device.

2. The method of claim 1, wherein the mobile device executes an application provided by a service provider, and the analytical server is configured to monitor the application.

3. The method of claim 2, further comprising:
   computing, a distance between a geographical location of each of the one or more points-of-interest and the geographical location of the mobile device; and
   sending, to the service provider, the geographical location of each of the one or more points-of-interest and the distance.

4. The method of claim 2, further comprising:
   obtaining configuration information from the service provider, the configuration information indicative of a level of granularity desired with respect to a distance measure between the one or more points-of-interest and the geographical location of the mobile device; and identifying, from a point-of-interest database, the plurality of points-of-interest in the second format based on the level of granularity.

5. The method of claim 4, further comprising:
transforming, via performing the Mercator projection, a geographical position of each of the one or more points-of-interest from the first format to the second format; and
constructing the point-of-interest search memory structure based on the transforming.

6. The method of claim 3, wherein the distance between each of the one or more points-of-interest and the geographical location of the mobile device is a Euclidean distance.

7. The method of claim 2, further comprising:
repeating, the transforming, the identifying, and the transmitting, with respect to one or more other mobile devices that execute the application provided by the service provider.

8. A computing device comprising:
a processor; and
a memory including instructions that, when executed with the processor, cause the computing device to, at least:
transform geographical location information of a mobile device from a first format to a second format by performing a Mercator projection of the geographical location information in the first format, wherein the first format corresponds to a latitude-longitude information of the mobile device in an ellipsoidal co-ordinate system, and the second format corresponds to a pair of co-ordinates in a Cartesian co-ordinate system;
identify, using a point-of-interest search memory structure, one or more points-of-interest from a plurality of points-of-interest that are geographically proximal to a geographical location of the mobile device, wherein the point-of-interest search memory structure is a supplemental R tree and includes geographical location information for the plurality of points-of-interest in the second format; and
transmit, to an analytical server, information indicative of the one or more points-of-interest and the geographical location information of the mobile device in the second format to enable the analytical server to perform analysis related to the mobile device.

9. The computing device of claim 8, wherein the mobile device executes an application provided by a service provider, and the analytical server is configured to monitor the application.

10. The computing device of claim 9, further configured to:
compute, a distance between a geographical location of each of the one or more points-of-interest and the geographical location of the mobile device; and send, to the service provider, the geographical location of each of the one or more points-of-interest and the distance.

11. The computing device of claim 9, further configured to:
obtain configuration information from the service provider, the configuration information indicative of a level of granularity desired with respect to a distance measure between the one or more points-of-interest and the geographical location of the mobile device; and
identify, from a point-of-interest database, the plurality of points-of-interest in the second format based on the level of granularity.

12. The computing device of claim 11, further configured to:
transform, via performing the Mercator projection, a geographical position of each of the one or more points-of-interest from the first format to the second format; and
construct the point-of-interest search memory structure based on transforming the geographical position.

13. A non-transitory computer readable medium storing specific computer-executable instructions that, when executed by a processor, cause a computer system to perform operations comprising:
transforming geographical location information of a mobile device from a first format to a second format by performing a Mercator projection of the geographical location information in the first format, wherein the first format corresponds to a latitude-longitude information of the mobile device in an ellipsoidal co-ordinate system, and the second format corresponds to a pair of co-ordinates in a Cartesian co-ordinate system;
identifying, using a point-of-interest search memory structure, one or more points-of-interest from a plurality of points-of-interest that are geographically proximal to a geographical location of the mobile device, wherein the point-of-interest search memory structure is a supplemental R tree and includes geographical location information for the plurality of points-of-interest in the second format; and
transmitting, to an analytical server, information indicative of the one or more points-of-interest and the geographical location information of the mobile device in the second format to enable the analytical server to perform analysis related to the mobile device.

14. The non-transitory computer readable medium storing specific computer-executable instructions of claim 13, wherein the mobile device executes an application provided by a service provider, and the analytical server is configured to monitor the application.

* * * * *